United States Patent
Dholakia et al.

(10) Patent No.: US 7,750,675 B2
(45) Date of Patent: Jul. 6, 2010

(54) METHOD FOR RUNNING STATE MACHINES

(75) Inventors: Ajay Dholakia, Apex, NC (US); Jan Van Lunteren, Gattikon (CH)

(73) Assignee: International Business Machines Corporation, Armonk, NY (US)

( * ) Notice: Subject to any disclaimer, the term of this patent is extended or adjusted under 35 U.S.C. 154(b) by 782 days.

(21) Appl. No.: 11/642,012

(22) Filed: Dec. 19, 2006

(65) Prior Publication Data

US 2007/0159653 A1 Jul. 12, 2007

(30) Foreign Application Priority Data

Dec. 23, 2005 (EP) .................................. 05112917

(51) Int. Cl.
*H03K 19/173* (2006.01)
*H03K 19/00* (2006.01)

(52) U.S. Cl. .......................................... 326/46; 326/93

(58) Field of Classification Search ................... 326/37, 326/46–47, 93
See application file for complete search history.

(56) References Cited

U.S. PATENT DOCUMENTS

| | | | | |
|---|---|---|---|---|
| 6,816,560 | B1 * | 11/2004 | Spalink | 375/368 |
| 7,117,381 | B2 * | 10/2006 | Kim et al. | 713/400 |
| 7,197,031 | B2 * | 3/2007 | Betts et al. | 370/367 |

* cited by examiner

*Primary Examiner*—James Cho
(74) *Attorney, Agent, or Firm*—Kenneth R. Corsello; Anne Vachon Dougherty

(57) ABSTRACT

A method and computer program product for running state machines by the steps of running at least a first and a second state machine in parallel, observing at least the first state machine for at least one first synchronization rule, and changing the state of the second state machine when the first synchronization rule applies.

11 Claims, 6 Drawing Sheets

State diagram for first state machine 10

State diagram for second state machine 20

METHOD FOR RUNNING STATE MACHINES

TECHNICAL FIELD

The invention relates to a method for running state machines and a corresponding apparatus and computer program.

BACKGROUND OF THE INVENTION

State machines, often also referred to as finite state machines (FSM), are widely used in many different areas, including development of integrated circuits, software engineering and character and voice recognition. State machines can be used to detect a particular pattern in a data stream, often referred to as parsing. Emerging trends in information technology demand ever higher processing rates.

It is an object of the invention to provide improved solutions for running state machines. It is a further object of the invention to provide solutions with increased processing rates.

SUMMARY OF THE INVENTION

According to a first aspect of the invention, there is provided a method for running at least a first and a second state machine in parallel, the method comprising:

observing at least the first state machine for at least one first synchronization rule, changing the state of the second state machine when the first synchronization rule applies.

According to this first aspect of the present invention there can be introduced a dependency of the state of the second state machine from the state of the first state machine. The first synchronization rule may only comprise a single state of the first state machine or a set of conditions that have to be fulfilled for applying the first synchronization rule. As an example, the first synchronization rule could specify a combination of a specific state of the first state machine and a further signal, e.g. a specific input signal of the first state machine. Only if this combination occurs, the first synchronization rule applies and the state of the second state machine will be changed.

According to a preferred embodiment of this aspect of the invention the method comprises further:

observing the second state machine for at least one second synchronization rule, changing the state of the first state machine when the second synchronization rule applies.

This introduces a mutual dependency of the first and the second state machines. The second synchronization rule may only comprise a single state of the second state machine or a set of conditions that have to be fulfilled for applying the second synchronization rule. As an example, the second synchronization rule could specify a combination of a specific state of the second state machine and a further signal, e.g. a specific input signal of the second state machine. Only if this combination occurs, the second synchronization rule applies and the state of the first state machine will be changed.

According to a further preferred embodiment of this aspect of the invention the method comprises further:

observing the first and the second state machine for at least one third synchronization rule, wherein the third synchronization rule comprises the combination of a synchronization state of the first state machine and a synchronization state of the second state machine, changing the state of the first and/or the second state machine when the third synchronization rule applies.

The third synchronization rule comprises at least the combination of a synchronization state in the first state machine and a synchronization state in the second state machine. Only if this combination occurs, the third synchronization rule applies and the state of the first state machine and/or the state of the second state machine will be changed.

This offers further possibilities to define synchronization rules and to change the status of the first and/or the second state machine in a very flexible way.

The method according to this aspect of the invention may be used for a lot of applications. It is in particular suited for the efficient run of parsing engines. By introducing a possibility to synchronize two state machines that run in parallel at specific synchronization points (when a synchronization rule applies), it is e.g. possible to improve the overall processing rate of the state machines. This can be done by forcing the slower state machine to move to a specific synchronization state if the faster state machine has reached this synchronization state.

Preferably, there will be defined a set of first, second, and/or third synchronization rules.

According to a second aspect of the invention, there is provided an apparatus comprising at least a first and a second state machine, the first and the second state machine being provided for running in parallel, the apparatus comprising a synchronization function for observing at least the first state machine for at least one first synchronization rule, the apparatus being provided for changing the state of the second state machine when the first synchronization rule applies.

According to a preferred embodiment of this aspect of the invention the synchronization function is further provided for observing the second state machine for at least one second synchronization rule, the apparatus being provided for changing the state of the first state machine when the second synchronization rule applies.

According to a further preferred embodiment of this aspect of the invention the synchronization function is provided for observing the first and the second state machine for a third synchronization rule, wherein the third synchronization rule comprises the combination of a synchronization state in the first state machine and a synchronization state in the second state machine and wherein the apparatus is provided for changing the state of the first and/or the second state machine when the third synchronization rule applies.

According to a further preferred embodiment of this aspect of the invention the apparatus comprises a first encoder and a first buffer for delivering an input signal to the first state machine and a second encoder and a second buffer for delivering an input signal to the second state machine, wherein the apparatus is provided for synchronizing the first and/or the second buffer when the first, second or third synchronization rule applies.

The first encoder and the second encoder may receive the same input stream and encode this input stream according to a first encoding scheme and according to a second encoding scheme respectively. The output of the first and the second encoder may have different data rates dependent on the respective encoding scheme. The first and the second buffer buffers these different data rates and deliver a data stream with a constant data rate to the first and the second state machine. By means of the synchronization of the first and the second buffer certain amounts of data, e.g. characters, can be skipped when one of the synchronization rules apply. In other words, these characters, which do not have to be processed anymore, can be removed from the buffer.

According to a further preferred embodiment of this aspect of the invention the apparatus comprises a central synchronizing unit for observing the first and the second state machine for the first, the second and the third synchronization rule.

Such a central synchronizing unit is an efficient way of implementing the synchronization function.

According to a further preferred embodiment of this aspect of the invention the first and the second state machine comprise a transition rule memory, a rule selector and a state register, wherein the rule selector is provided for receiving an external input signal and an internal input signal from the state register indicating the current state and wherein the rule selector is provided for observing the internal and external input signal by means of the transition rule memory for transition rules and for changing the state of the state register when a transition rule applies.

This embodiment is an efficient way of implementing the first and the second state machine.

According to a further preferred embodiment of this aspect of the invention the central synchronizing unit comprises a synchronization rule memory and a synchronization rule selector, wherein the synchronization rule memory stores the synchronization rules, wherein the synchronization rule selector being provided for observing the states of the first and the second state machine for the first, the second and/or the third synchronization rule and for changing the state of the first and/or the second state machine when the first, the second and/or the third synchronization rule applies.

This embodiment is an efficient way of implementing the central synchronizing unit.

According to a further preferred embodiment of this aspect of the invention the apparatus is provided for detecting a pattern in a data stream. Such pattern matching applications are e.g. used for character and voice recognition or for XML-processing. By means of the invention the processing rate of such applications can be improved significantly.

According to a third aspect of the invention there is provided a computer program comprising instructions for carrying out the method according to anyone of claims 1 to 3 when said computer program is executed on a computer system.

BRIEF DESCRIPTION OF THE DRAWINGS

Preferred embodiments of the present invention are described in detail below, by way of example only, with reference to the following schematic drawings, in which.

The drawings are provided for illustrative purposes only and do not necessarily present practical examples of the present invention to scale.

DETAILED DESCRIPTION OF THE INVENTION

Figure 1:
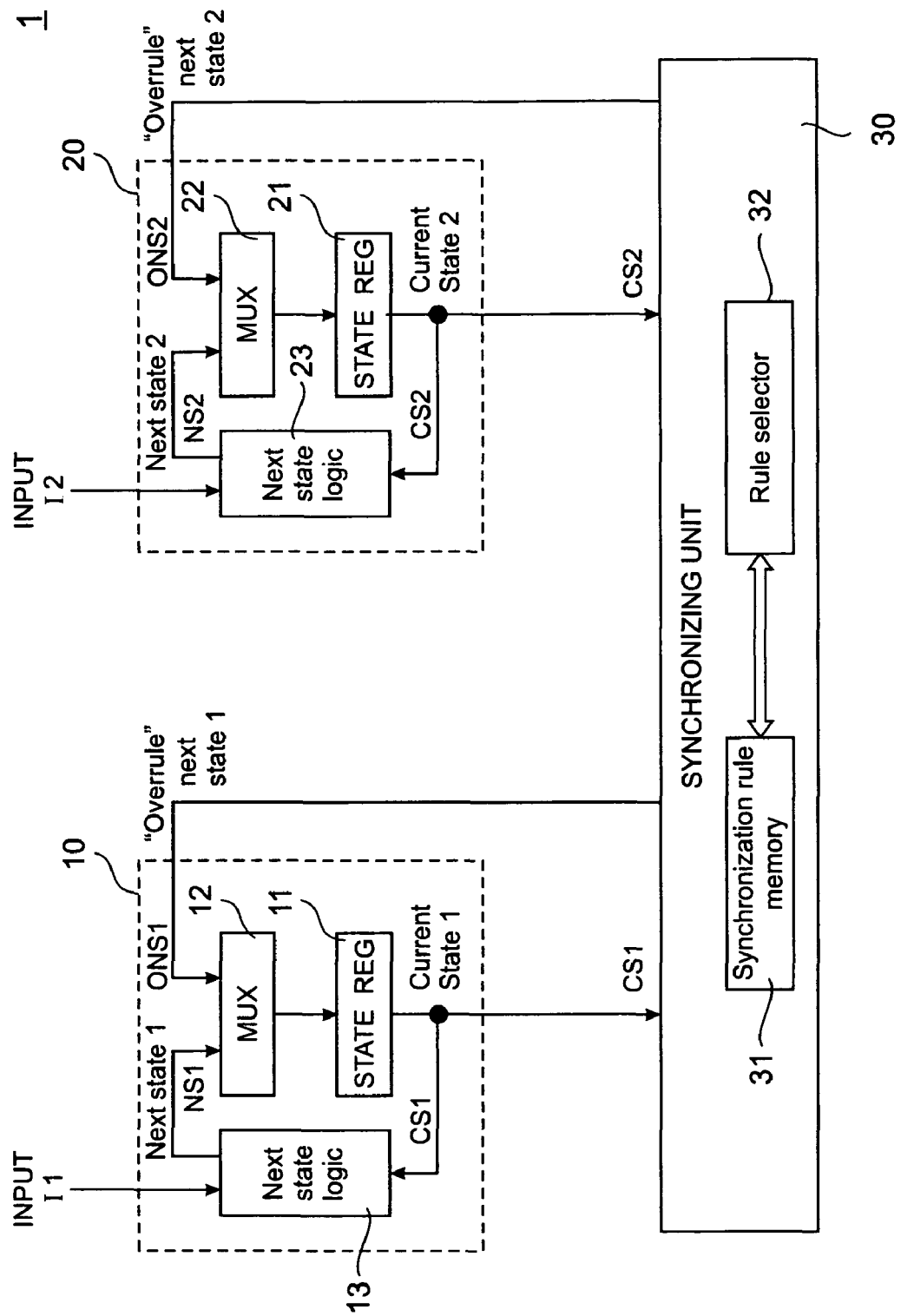
FIG. 1 is a schematic drawing of an apparatus comprising a first and a second state machine according to a first embodiment of the invention.

FIG. 1 shows schematically an apparatus 1 comprising a first state machine 10 and a second state machine 20. The first state machine 10 comprises a state register 11, a multiplexer 12 and a next stage logic 13. The second state machine 20 comprises a state register 21, a multiplexer 22 and a next stage logic 23. The next stage logic 13 is provided for receiving a first external input signal I1. In addition the next stage logic 13 receives a current state signal CS1 from the state register 11. The next stage logic 23 is provided for receiving a second external input signal I2. In addition the next stage logic 23 receives a current state signal CS2 from the state register 21.

The apparatus 1 comprises further a central synchronizing unit 30 for observing the first state machine 10 and the second state 20 machine for first, second and third synchronization rules. A first synchronization rule is a rule that comprises a specific state of the state register 11 of the first state machine 10 and optionally some further conditions, e.g. a specific first external input signal I1. A second synchronization rule is a rule that comprises a specific state of the state register 21 of the second state machine 20 and optionally some further conditions, e.g. a specific second external input signal I2. A third synchronization rule comprises the combination of a specific state of the first state machine 10 and a specific state of the second state machine 20. In addition, a third synchronization rule may comprise some further conditions, e.g. a specific first external input signal I1 or a specific second external input signal I2.

In the apparatus 1 of FIG. 1 the central synchronizing unit 30 receives as input signals the current state signal CS1 from the output of the state register 11 and the current state signal CS2 from the output of the state register 21.

The multiplexer 12 of the first state machine 10 is provided for receiving as input signals a next state signal NS1 from the next state logic 13 and an overrule next state signal ONS1 from the central synchronizing unit 30.

The multiplexer 22 of the second state machine 20 is provided for receiving as input signals a next state signal NS2 from the next state logic and 23 and an overrule next state signal ONS2 from the central synchronizing unit 30.

The central synchronizing unit 30 comprises a synchronization rule memory 31 and a synchronization rule selector 32. The synchronization rule memory 31 stores a set of first, second and third synchronization rules. As an example, such synchronization rules can be stored in the form of a synchronization rule vector.

Figure 2:
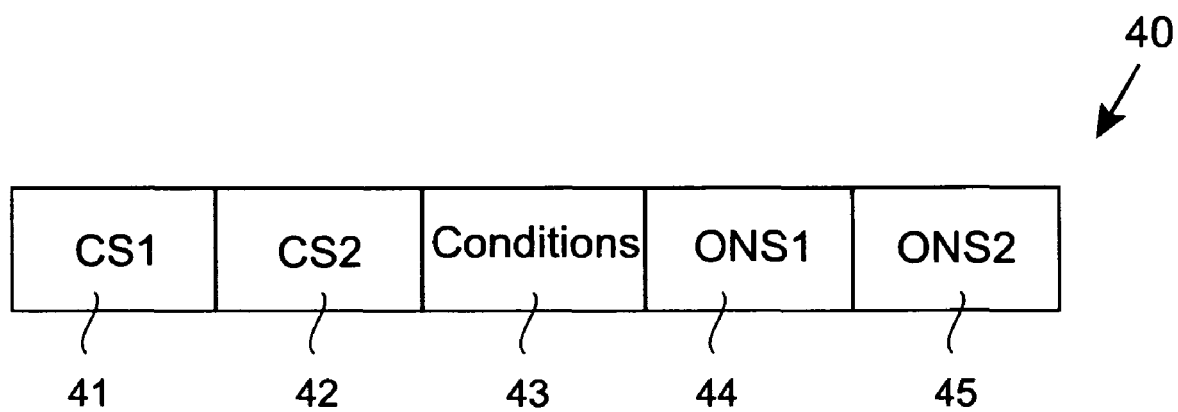
FIG. 2 is a schematic drawing of a synchronization rule vector.

An exemplary embodiment of such a synchronization rule vector 40 is illustrated in FIG. 2. The synchronization rule vector 40 comprises a field 41 with a specific current state CS1 of the first state machine 10, a field 42 with a specific current state CS2 of the second state machine 20, a field 43 where further conditions may be defined, a field 44 with a specific overrule next state signal ONS1 indicating an overrule state for the first state machine 10 and a field 45 with a specific overrule next state signal ONS2 indicating an overrule state for the second state machine 20.

As an example, further conditions in the field 43 may be additional input signals or error conditions indicating e.g. a memory overflow.

Referring back to FIG. 1, the synchronization rule selector 32 observes by means of the synchronization rule memory 31 the current state signal CS1 and the current state signal CS2 for the occurrence of a first, a second or a third synchronization rule.

The synchronization of the first state machine 10 and the second state machine 20 works as follows:

If one of the first, the second or the third synchronization rule applies, the central synchronizing unit 30 transmits an overrule next state signal ONS1 to the multiplexer 12 of the first state machine 10 and/or or an overrule next state signal ONS2 to the multiplexer 22 of the second state machine 20. These overrule next state signals ONS1 and ONS2 overrule the next state signals NS1 of the next state logic 13 and NS2 of the next state logic 23 respectively, which is controlled by the multiplexer 12 and the multiplexer 22 respectively. In other words, instead of changing the state of the state register 11 to NS1 and the state of the state register 21 to NS2 respectively, the state of the state register 11 is changed to ONS1 and the state of the state register 21 is changed to ONS2 respectively.

Figure 3:
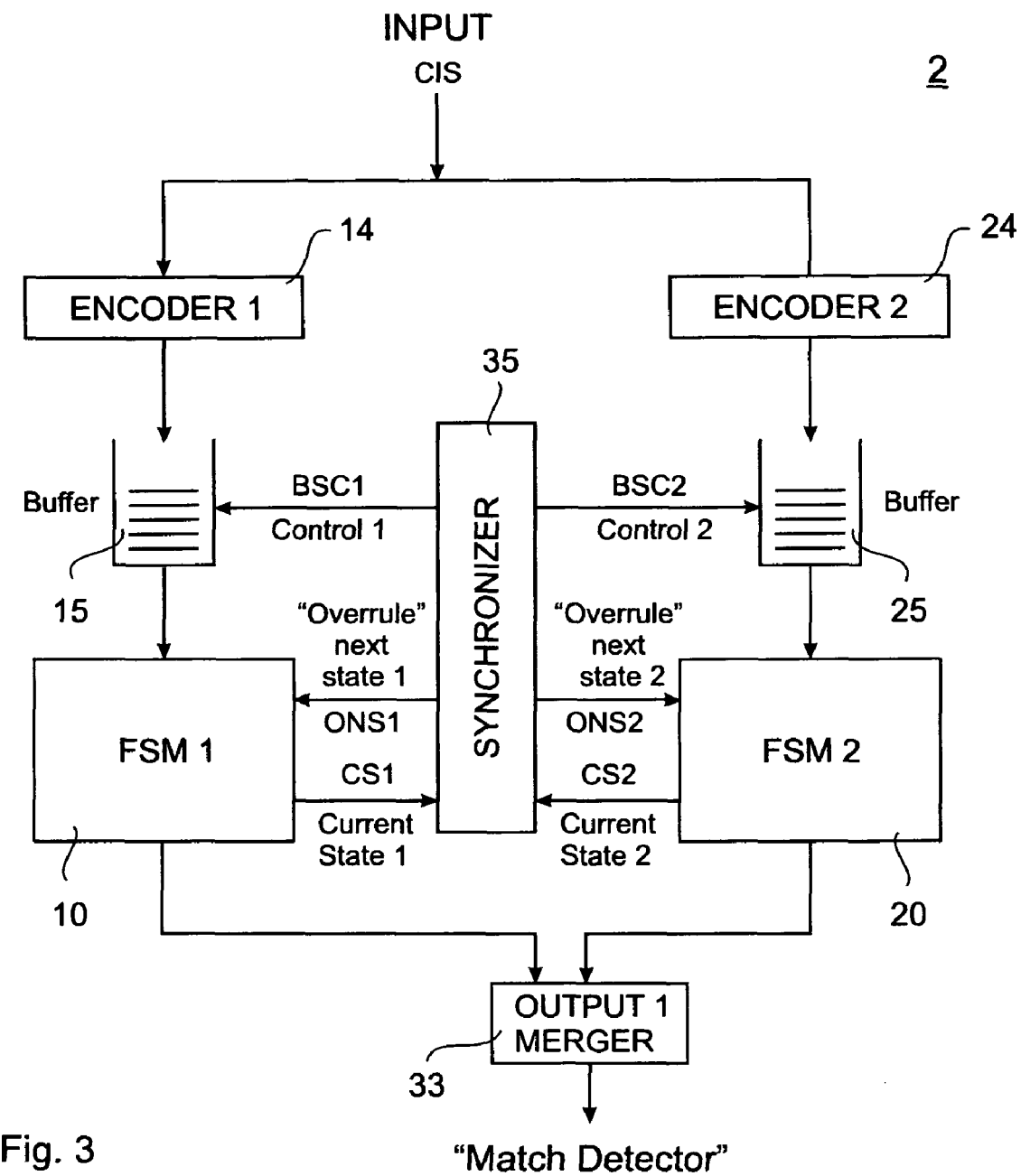
FIG. 3 is a schematic drawing of an apparatus comprising a first and a second state machine according to a second embodiment of the invention.

FIG. 3 shows an apparatus 2 as an exemplary application of the apparatus 1 according to FIG. 1. The same or similar elements are therefore denoted with the same reference numerals. The apparatus 2 comprises the first state machine 10 and the second state machine 20 as described with reference to FIG. 1. In addition, the apparatus 2 comprises a first encoder 14 and a first buffer 15 as well as a second encoder 24 and a second buffer 25. The first encoder 14 and the second encoder 24 receive a common input signal CIS. The common input signal CIS is encoded by the first encoder 14 according to a first encoding scheme and in parallel encoded by to the second encoder 24 according to a second encoding scheme. The first encoder 14 delivers the encoded common input signal CIS to the first buffer 15 and the second encoder 24 delivers the encoded common input signal CIS to the second buffer 25. The first buffer 15 and the second buffer 25 can be implemented e.g. as a ring buffer. The first buffer 15 delivers the common input signal CIS coded according to the first encoding scheme to the first state machine 10 and the second buffer 25 delivers the common input signal CIS coded according to the second encoding scheme to the second state machine 20.

The apparatus 2 comprises further a central synchronizing unit 35 which is similar to the central synchronizing unit 30 as described with reference to FIG. 1.

Accordingly, the central synchronizing unit 35 receives as input signals the current state signal CS1 from the first state machine 10 and the current state signal CS2 from the second state machine 20. In addition the central synchronizing unit 35 is provided for sending the overrule next state signal ONS1 to the first state machine 10 and the overrule next state signal ONS2 to the second state machine 20.

In addition, the central synchronizing unit 35 is provided for delivering a first buffer synchronisation control signal BSC1 to the first buffer 15 and a second buffer synchronisation control signal BSC2 to the second buffer 25. The first buffer synchronisation control signal BSC1 is provided for synchronizing the first buffer 15 when the state of the first state register 10 is overruled by means of the overrule next state signal ONS1. The second buffer synchronisation control signal BSC2 is provided for synchronizing the second buffer 25 when the state of the second state register 20 is overruled by means of the overrule next state signal ONS2.

As an example, upon receipt of the first buffer synchronisation control signal BSC1 and the second buffer synchronisation control signal BSC2 a certain amount of characters or data elements could be skipped or removed from the first buffer 15 and the second buffer 25 respectively. These skipped or removed data elements do not have to be processed anymore, e.g. as one of the two state machines was faster and has processed these skipped data elements already.

The output signals of the first state machine 10 and the second state machine 20 are merged in an output unit 33 and may be forwarded to a match detector.

The application of the synchronized first state machine 10 and the second state machine 20 for improved pattern matching as depicted in FIG. 3, will now be illustrated using the following simple example.

The input stream of the common input signal CIS consists of the following characters: "abcdefg". The input stream for the first state machine 10 is not encoded, which means that the first encoder 14 directly copies its input to its output. The input stream of the second state machine 20 is encoded in the following way:

|  | code | length |
|---|---|---|
| "abc" | 01 | 1 byte |
| "de" | 02 | 1 byte |
| "f" | 03 | 1 byte |
| "g" | 00 01 | 2 bytes |

In this case, the codeword 00 is the start byte of a multi-byte code.

Applying this encoding on the input stream of the common input signal CIS will result in the following code sequence that represents the input to second state machine 20:

01 02 03 00 01

In this example, both the first state machine 10 and the second state machine 20 will parse an input pattern "abcdefg".

Figure 4:
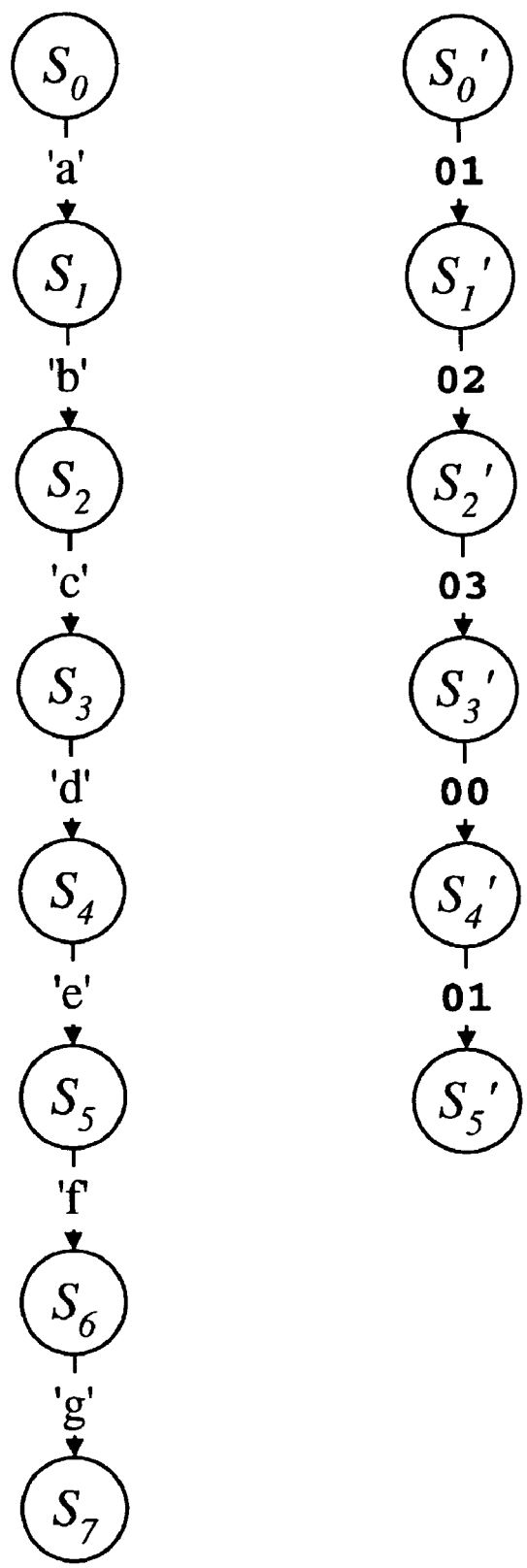
FIG. 4 is a state diagram.

The corresponding state transition diagrams for the first state machine 10 and the second state machine 20 are shown in FIG. 4. The input to the first state machine 20 consists of the (non-encoded) input stream of the common input signal CIS, whereas the input to the second state machine 20 consists of the code words that are the result of the encoding of the same input stream according to the encoding description above. Both the first state machine 10 and the second state machine 20 will process one byte in each state transition. Assuming that the input stream of the common input signal CIS is comprised of ASCII characters, this would mean that the first state machine 10 will process one character per transition. It is also assumed that the first state machine 10 and the second state machine 20 will perform one transition per clock cycle, resulting in a processing rate of one byte per clock cycle.

The state diagrams of the first state machine 10 and the second state machine 20 can be described using the following two transition tables:

First State Machine 10:

| cur. state | input | -> | next state |
|---|---|---|---|
| S0 | 'a' | -> | S1 |
| S1 | 'b' | -> | S2 |
| S2 | 'c' | -> | S3 |
| S3 | 'd' | -> | S4 |
| S4 | 'e' | -> | S5 |
| S5 | 'f' | -> | S6 |
| S6 | 'g' | -> | S7 |

Second State Machine 20:

| cur. state | input | -> | next state |
|---|---|---|---|
| S0' | 01 | -> | S1' |
| S1' | 02 | -> | S2' |
| S2' | 03 | -> | S3' |
| S3' | 00 | -> | S4' |
| S4' | 01 | -> | S5' |

If the first state machine 10 and the second state machine 20 run independently, then the following transitions will be made (one per cycle), assuming that both machines start in state S0 and S0' respectively:

| cycle: | 1 | 2 | 3 | 4 | 5 | 6 | 7 |
|---|---|---|---|---|---|---|---|

First State Machine 10:

| | input: | | | | | | |
|---|---|---|---|---|---|---|---|
| | 'a' | 'b' | 'c' | 'd' | 'e' | 'f' | 'g' |
| next state: | S1 | S2 | S3 | S4 | S5 | S6 | S7 |

Second State Machine 20:

| | input: | | | | |
|---|---|---|---|---|---|
| | 'abc' | 'de' | 'f' | 'g' | |
| code word: | 01 | 02 | 03 | 00 | 01 |
| next state: | S1' | S2' | S3' | S4' | S5' |

The first state machine 10 needs 7 transitions to process the entire input stream "abcdef", corresponding to 7 clock cycles. The second state machine 20 needs 5 transitions, and thus, 5 cycles, to process the entire encoded version of the same input stream.

The states in both transition diagrams correspond to the following strings being detected in the input stream of the common input signal CIS.

| state | string |
|---|---|
| S1 | a |
| S2 | ab |
| S3 | abc |
| S4 | abcd |
| S5 | abcde |
| S6 | abcdef |
| S7 | abcdefg |
| S1' | abc |
| S2' | abcde |
| S3' | abcdef |
| S5' | abcdefg |

Note that S4' does not correspond to a complete character string.

The following pairs of states can be regarded as "equivalent" because these relate to the same string that has been parsed "up to then" in the input stream by the first state machine 10 and the second state machine 20.

| | string: |
|---|---|
| S3, S1' | abc |
| S5, S2' | abcde |
| S6, S3' | abcdef |
| S7, S5' | abcdefg |

The synchronizing unit 35 in FIG. 3 will now synchronize the first state machine 10 and the second state machine 20 at two pairs of "equivalent" states, namely states S5 and S2' and states S7 and S5'. For example, this means that if the second state machine 20 would reach state S2' before the first state machine 10 reaches state S5, then the first state machine 10 will be "overruled" to go directly to state S5. This is established by sending an overrule next state signal ONS1 to the multiplexer 12 of the first state machine 10. This affects the timing of the state machine operation as shown above, in the following way:

| | cycle: | | | |
|---|---|---|---|---|
| | 1 | 2 | 3 | 4 |
| | First state machine 10: | | | |
| input: | 'a' | 'b' (skip 'cde') | 'f' | 'g' |
| next state: | S1 | S2 -> S5 (overruled) | S6 | S7 |
| | Second state machine 20: | | | |
| input: | 'abc' | 'de' | 'f' | 'g' |
| code word: | 01 | 02 | 03 | 00 (skip 01) |
| next state: | S1' | S2' | S3' | S4' -> S5' (overruled) |
| | Synchronizing unit 30: | | | |
| | SYNC | | | SYNC |

In addition to synchronizing at states S5 and S2', and at states S7 and S5', the central synchronizing unit 35 will also skip the correct number of input characters or code words, i.e., remove these from the corresponding first buffer 15 or second buffer 25 according to FIG. 3, as is illustrated in the above timeline. This synchronizes the run of the first buffer 15 and the second buffer 25.

The total processing time is now equal to 4 cycles, which is one cycle less compared to the state machines that were not synchronized. This simple example shows that the total processing time can be reduced through state machine synchronization.

For the above example the following synchronization rules are applied by the central synchronizing unit 35 of FIG. 3 for the current state signal CS1, the current state signal CS2, the overrule next state signal ONS1, the overrule next state signal ONS2, the first buffer synchronization control signal BSC1 and the second buffer synchronization control signal BSC2:

Synchronization Rules:

| CS1 | CS2 | -> | ONS1 | BSC1 | ONS2 | BSC2 |
|---|---|---|---|---|---|---|
| * | S2' | -> | S5 | 3 | — | — |
| S7 | * | -> | — | — | S5' | 1 |

In this example the first buffer synchronization control signal BSC1 and the second buffer synchronization control signal BSC2 indicate the number of bytes to be skipped in the first buffer 15 and the second buffer 25.

For the ease of understanding, this extremely simple example was chosen. However, the same concept can be applied very effectively to two or more state machines each implementing much larger and complex state transition diagrams.

Figure 5:
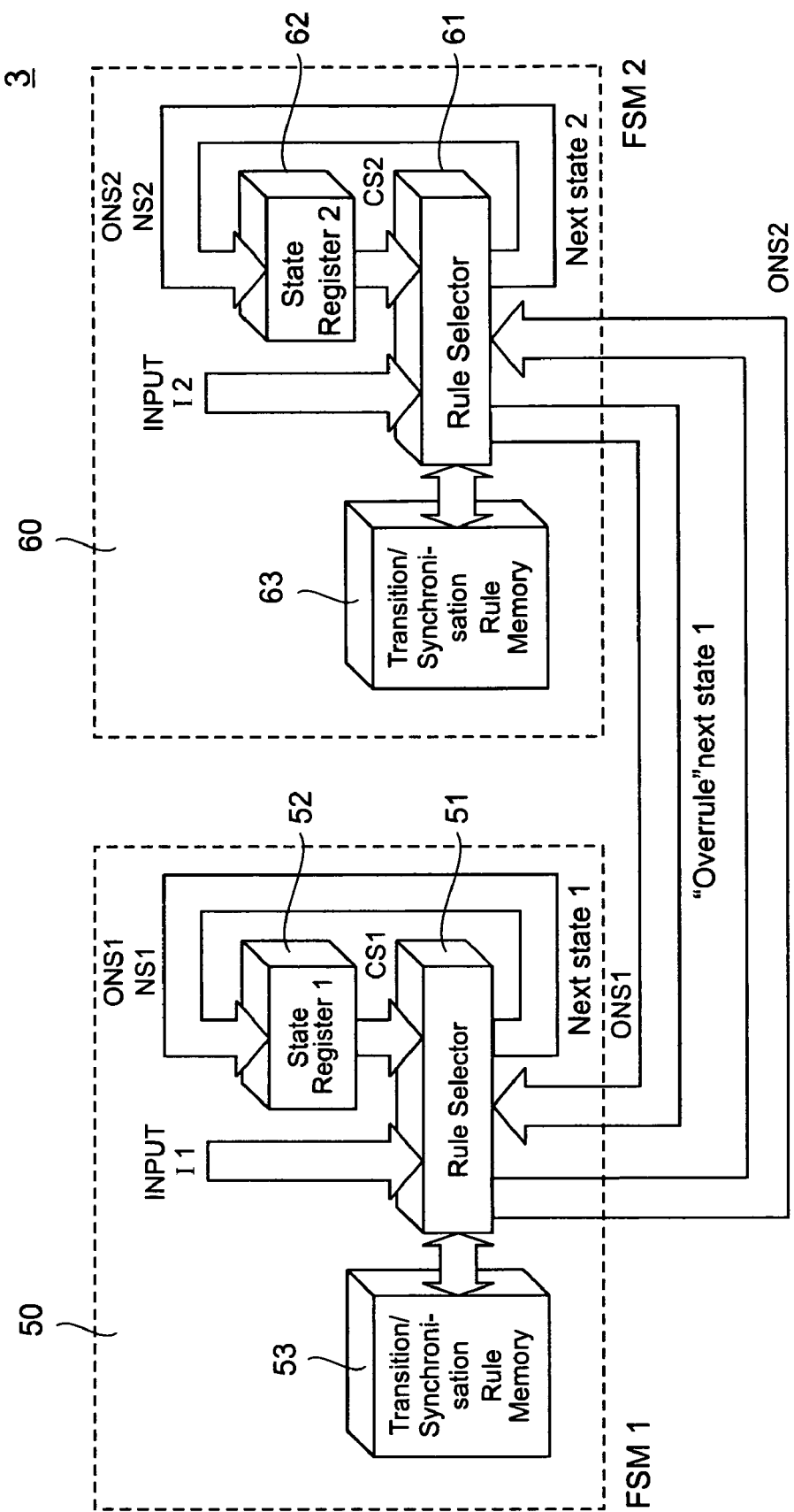
FIG. 5 is a schematic drawing of an apparatus comprising a first and a second state machine according to a third embodiment of the invention.

FIG. 5 shows an apparatus 3 according to another embodiment of the invention in which the synchronizing function is distributed over a third state machine 50 and a fourth state machine 60 instead of being implemented as a separate central component like the above described central synchronizing units 30 and 35. The third state machine 50 comprises a rule selector 51, a state register 52 and a transition and synchronization rule memory 53. The fourth state machine 60 comprises a rule selector 61, a state register 62 and a transition and synchronization rule memory 63.

The transition and synchronization rule memory 53 stores a set of first synchronization rules as well as a set of first transition rules. The transition and synchronization rule memory 63 stores a set of second synchronization rules as well as a set of second transition rules.

As an example, such transition and synchronization rules can be stored in form of a rule vectors.

FIG. 6a-6d illustrate examples of such rule vectors that can be used for the apparatus 3 shown in FIG. 5.

Figure 6A:
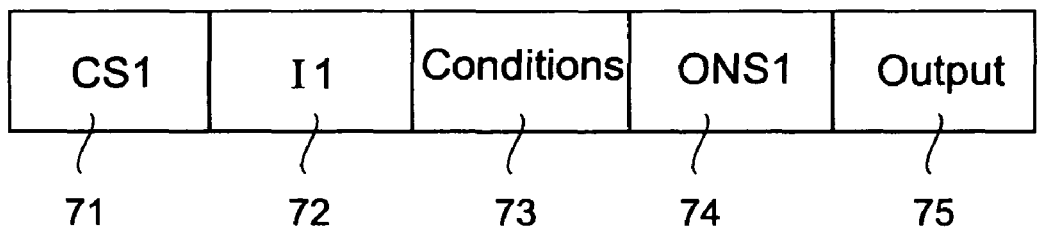
FIGS. 6a-6d are schematic drawings of transition rule vectors and synchronization rule vectors.

FIG. 6a shows a first transition rule vector 70 of the third state machine 50.

The first transition rule vector 70 comprises a field 71 with a specific current state CS1 of the third state machine 50, a field 72 with a specific input signal I1 of the third state machine 50, a field 73 with further conditions, a field 74 with a specific next state NS1 of the third state machine 50 and a field 75 in which a specific output signal could be indicated.

Figure 6B:
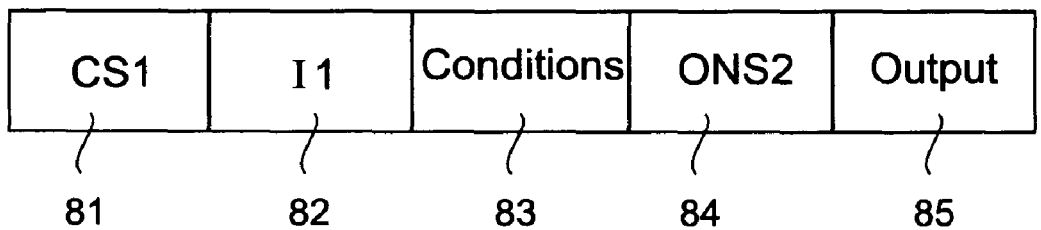

FIG. 6b shows a first synchronization rule vector 80 of the third state machine 50.

The first synchronization rule vector 80 comprises a field 81 with a specific current state CS1 of the third state machine 50, a field 82 with a specific input signal I1 of the third state machine 50, a field 83 with further conditions, a field 84 with a specific overrule next state ONS2 of the fourth state machine 50 and a field 85 in which a specific output signal could be indicated.

Figure 6C:
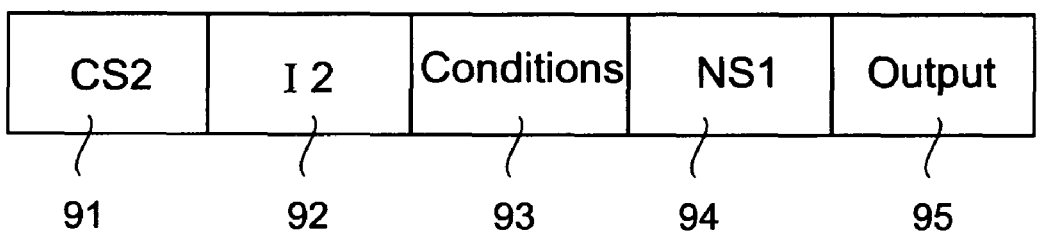

FIG. 6c shows a second transition rule vector 90 of the fourth state machine 60:

The second transition rule vector 90 comprises a field 91 with a specific current state CS2 of the fourth state machine 60, a field 92 with a specific input signal I2 of the fourth state machine 60, a field 93 with further conditions, a field 94 with a specific next state NS2 of the fourth state machine 60 and a field 95 in which a specific output signal could be indicated.

Figure 6D:
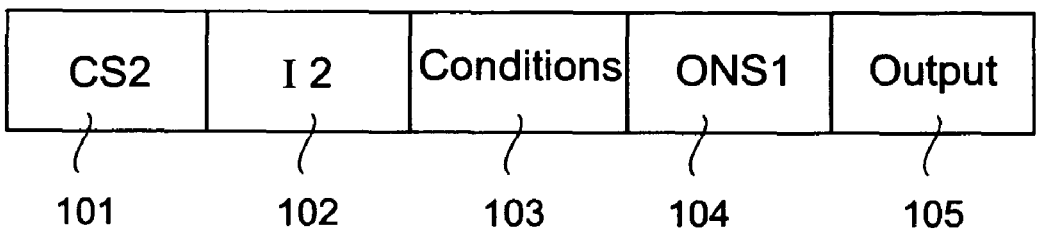

FIG. 6d shows a second synchronization rule vector 100 of the fourth state machine 60.

The second synchronization rule vector 100 comprises a field 101 with a specific current state CS2 of the fourth state machine 60, a field 102 with a specific input signal I2 of the fourth state machine 60, a field 103 with further conditions, a field 104 with a specific overrule next state ONS1 of the third state machine 50 and a field 105 in which a specific output signal could be indicated.

In the condition fields it may be specified if the specified content, e.g. the specified state, of the current state fields and/or the input signal fields is mandatory or not mandatory. If the specified content is not mandatory, the specified content of this field has not to be taken into account, i.e. it has "don't care" status.

Referring back to FIG. 5, the rule selector 51 receives an external input signal I1 and a current state signal CS1 from the state register 52. The state register 52 receives, as trigger for a next state, a next state signal NS1 from the rule selector 51. The rule selector 51 observes the current state signal CS1 and the input signal I1 for the occurrence of a first synchronization rule or a first transition rule. If a first transition rule applies, the rule selector 51 sends a next state signal NS1 to the state register 52 and the state of the state register 52 is changed accordingly. If a first synchronization rule applies, the rule selector 51 sends an overrule next state signal ONS2 to the rule selector 61 of the fourth state machine 60. Then the rule selector 61 sends the overrule next state signal ONS2 to the state register 62 which changes its state accordingly.

The rule selector 61 receives an external input signal I2 and a current state signal CS2 from the state register 62. The state register 62 receives as trigger for a next state a next state signal NS2 from the rule selector 61. The rule selector 61 observes the current state signal CS2 and the input signal I2 for the occurrence of a second synchronization rule or a second transition rule. If a second transition rule applies, the rule selector 61 sends a next state signal NS2 to the state register 62 and the state of the state register 62 is changed accordingly. If a second synchronization rule applies, the rule selector 61 sends an overrule next state signal ONS1 to the rule selector 51 of the third state machine 50. Then the rule selector 51 sends the overrule next state signal ONS1 to the state register 52 which changes its state accordingly.

Any disclosed embodiment may be combined with one or several of the other embodiments shown and/or described. This is also possible for one or more features of the embodiments.

The present invention can be realized in hardware, software, or a combination of hardware and software. Any kind of computer system—or other apparatus adapted for carrying out the method described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion

The invention claimed is:

1. A computer-implemented method for running state machines, the method comprising:
   running at least a first and a second state machine in parallel;
   observing at least the first state machine for at least one first synchronization rule;
   changing the state of the second state machine when the first synchronization rule applies;
   observing the second state machine for at least one second synchronization rule; and
   changing the state of the first state machine when the second synchronization rule applies.

2. A computer-implemented method for running state machines, the method comprising:
   running at least a first and a second state machine in parallel;
   observing at least the first state machine for at least one first synchronization rule; and changing the state of the second state machine when the first synchronization rule applies;

observing the first and the second state machine for at least one third synchronization rule, wherein the third synchronization rule comprises the combination of a synchronization state in the first state machine and a synchronization state in the second state machine; and changing the state of the first and/or the second state machine when the third synchronization rule applies.

3. Apparatus comprising at least a first and a second state machine the first and the second state machine being provided for running in parallel, the apparatus comprising:

a synchronization mechanism for observing at least the first state machine for at least one first synchronization rule; and a state changing mechanism for changing the state of the second state machine when the first synchronization rule applies, wherein the synchronization mechanism is further adapted to observe the second state machine for at least one second synchronization rule, and wherein the state changing mechanism changes the state of the first state machine when the second synchronization rule applies.

4. Apparatus comprising at least a first and a second state machine, the first and the second state machine being provided for running in parallel, the apparatus comprising:

a synchronization mechanism for observing at least the first state machine for at least one first synchronization rule; and a state changing mechanism for changing the state of the second state machine when the first synchronization rule applies, wherein the synchronization mechanism is provided for observing the first and the second state machine for a third synchronization rule, wherein the third synchronization rule comprises the combination of a synchronization state in the first state machine and a synchronization state in the second state machine and wherein the state changing mechanism changes the state of at least one of the first and second state machine when the third synchronization rule applies.

5. Apparatus comprising at least a first and a second state machine, the first and the second state machine being provided for running in parallel, the apparatus comprising:

a synchronization mechanism for observing at least the first state machine for at least one first synchronization rule; and a state changing mechanism for changing the state of the second state machine when the first synchronization rule applies, wherein the apparatus further comprises a first encoder and a first buffer for delivering an input signal to the first state machine, wherein the apparatus comprises a second encoder and a second buffer for delivering an input signal to the second state machine and wherein the apparatus is provided for synchronizing at least one of the first and the second buffer when a synchronization rule applies.

6. Apparatus comprising at least a first and a second state machine the first and the second state machine being provided for running in parallel, the apparatus comprising:

a synchronization mechanism for observing at least the first state machine for at least one first synchronization rule; and a state changing mechanism for changing the state of the second state machine when the first synchronization rule applies, wherein the first and the second state machine comprise a transition rule memory, a rule selector and a state register, wherein the rule selector is provided for receiving an external input signal and an internal input signal from the state register indicating the current state and wherein the rule selector is provided for observing the internal and external input signal by means of the transition rule memory for transition rules and for changing the state of the state register when a transition rule applies.

7. The apparatus according to claim 6, wherein the apparatus is provided for detecting a pattern in a data stream.

8. Apparatus comprising at least a first and a second state machine, the first and the second state machine being provided for running in parallel, the apparatus comprising:

a synchronization mechanism for observing at least the first state machine for at least one first synchronization rule; and a state changing mechanism for changing the state of the second state machine when the first synchronization rule applies, wherein the apparatus comprises a central synchronizing unit for observing the first and the second state machine for at least one synchronization rule and wherein the central synchronizing unit comprises a synchronization rule memory and a synchronization rule selector, wherein the synchronization rule memory stores the synchronization rules, wherein the synchronization rule selector is provided for observing the states of the first and the second state machine for at least one synchronization rule and for changing the state of at least one of the first and the second state machine when at least one synchronization rule applies.

9. The apparatus according to claim 8, wherein the apparatus is provided for detecting a pattern in a data stream.

10. A computer readable medium having encoded thereon a program comprising instructions for carrying out a method for running state machines, the method comprising the steps of:

running at least a first and a second state machine in parallel;

observing at least the first state machine for at least one first synchronization rule;

changing the state of the second state machine when the first synchronization rule applies;

observing the second state machine for at least one second synchronization rule; and changing the state of the first state machine when the second synchronization rule applies.

11. A computer readable medium having encoded thereon a program comprising instructions for carrying out a method for running state machines, the method comprising the steps of:

running at least a first and a second state machine in parallel;

observing at least the first state machine for at least one first synchronization rule;

changing the state of the second state machine when the first synchronization rule applies;

observing the first and the second state machine for at least one third synchronization rule, wherein the third synchronization rule comprises the combination of a synchronization state in the first state machine and a synchronization state in the second state machine; and changing the state of the first and/or the second state machine when the third synchronization rule applies.

* * * * *